(12) United States Patent
Suzuki et al.

(10) Patent No.: US 8,110,013 B2
(45) Date of Patent: Feb. 7, 2012

(54) POLISHING COMPOSITION

(75) Inventors: Masahiko Suzuki, Wakayama (JP);
Yuichi Homma, Wakayama (JP);
Yukiko Yamawaki, Wakayama (JP)

(73) Assignee: Kao Corporation, Tokyo (JP)

( * ) Notice: Subject to any disclaimer, the term of this patent is extended or adjusted under 35 U.S.C. 154(b) by 842 days.

(21) Appl. No.: 11/896,492

(22) Filed: Aug. 31, 2007

(65) Prior Publication Data

US 2008/0115422 A1 May 22, 2008

(30) Foreign Application Priority Data

Sep. 8, 2006 (JP) ................................. 2006-244777

(51) Int. Cl.
*C09K 3/14* (2006.01)
*B24D 3/02* (2006.01)
*C09C 1/68* (2006.01)

(52) U.S. Cl. ............................. 51/307; 51/298; 51/309

(58) Field of Classification Search ................... 51/307, 51/298, 309
See application file for complete search history.

(56) References Cited

U.S. PATENT DOCUMENTS 3,378,513 A 4/1968 Witwer
(Continued)

FOREIGN PATENT DOCUMENTS

CN 1497010 A 5/2004
(Continued)

OTHER PUBLICATIONS

Office Action issued Jan. 5, 2011, in Chinese Application No. 200710149086.4, with English translation.
(Continued)

*Primary Examiner* — James McDonough
(74) *Attorney, Agent, or Firm* — Birch, Stewart, Kolasch & Birch, LLP

(57) ABSTRACT

A polishing composition includes a copolymer and an abrasive. The copolymer has a constitutional unit expressed as the following formula (I) and at least one of constitutional units expressed as the following formulas (II) to (IV). Methoxypolyethylene glycol methacrylate etc. are used as monomers for forming the constitutional unit of the formula (I), stearyl methacrylate etc. are used as monomers for forming the constitutional unit of the formula (II), polypropylene glycol methacrylate etc. are used as monomers for forming the constitutional unit of the formula (III), and styrene etc. are used as monomers for forming the constitutional unit of the formula (IV).

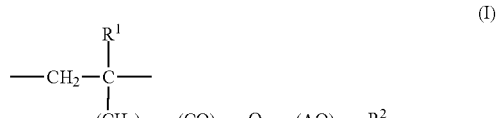

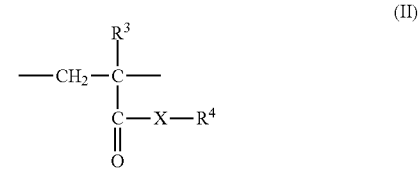

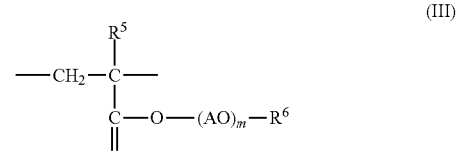

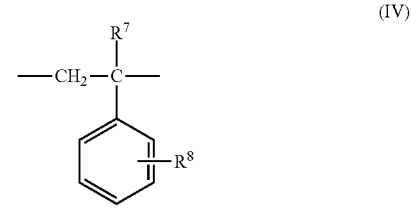

6 Claims, 2 Drawing Sheets

U.S. PATENT DOCUMENTS

| | | | | |
|---|---|---|---|---|
| 5,814,144 | A * | 9/1998 | Coutts et al. | 106/499 |
| 6,410,626 | B1 * | 6/2002 | Wada et al. | 524/266 |
| 6,443,827 | B1 * | 9/2002 | Ryoke et al. | 451/533 |
| 2002/0102923 | A1 | 8/2002 | Sugiyama et al. | |
| 2003/0121214 | A1 | 7/2003 | Ishibashi | |
| 2004/0065021 | A1 * | 4/2004 | Yoneda et al. | 51/298 |
| 2004/0186206 | A1 * | 9/2004 | Yoneda et al. | 524/95 |
| 2005/0027036 | A1 | 2/2005 | Takizawa et al. | |

FOREIGN PATENT DOCUMENTS

| | | |
|---|---|---|
| GB | 2371555 A | 7/2002 |
| JP | 2002-167575 A | 6/2002 |
| JP | 2003-160781 A | 6/2003 |

OTHER PUBLICATIONS

Office Action issued Jan. 24, 2011, in U.K. Patent Application No. GB1100415.7.

* cited by examiner

POLISHING COMPOSITION

FIELD OF THE INVENTION

The present invention relates to a polishing composition and a method for manufacturing a substrate using the polishing composition.

BACKGROUND OF THE INVENTION

With the rapid widespread use of computers and the start-up of digital broadcasting or the like, there have been demands for a hard disk drive with a larger storage capacity. To increase the storage capacity, e.g., the recording area is increased by suppressing the occurrence of roll-off (edge rounding of the end side of a substrate) during the polishing process of a memory hard disk used in a hard disk drive. As a polishing composition for suppressing roll-off, e.g., JP 2002-167575 A proposes a polishing composition including a monomer compound of polyoxyethylene and an acid, and JP 2003-160781 A proposes a polishing composition including a monomer compound such as polyoxyethylene sorbitan fatty acid ester.

However, as the information society expands, a further increase in the storage capacity is required. Therefore, the effect of suppressing roll-off by the conventional polishing compositions is not sufficient to meet such a requirement, and a polishing composition capable of suppressing more roll-off has been needed.

SUMMARY OF THE INVENTION

The present invention relates to a polishing composition that includes a copolymer and an abrasive. The copolymer has a constitutional unit expressed as the following formula (I) and at least one constitutional unit selected from the group consisting of constitutional units expressed as the following formulas (II) to (IV). The present invention also relates to a method for manufacturing a substrate that includes polishing a substrate to be polished with the polishing composition.

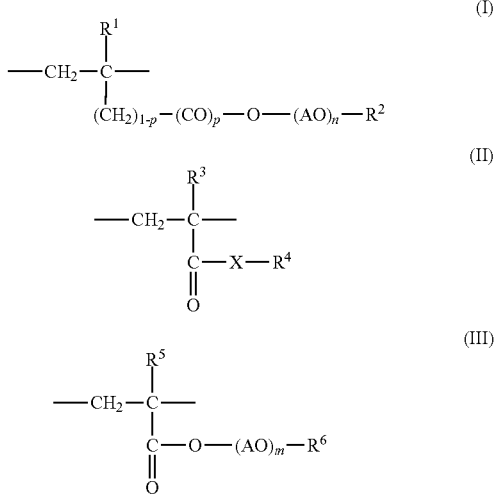

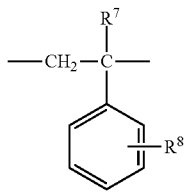

(where in the formula (I), $R^1$ is a hydrogen atom or a methyl group, $R^2$ is a $C_1$ to $C_4$ alkyl group, AO is a $C_1$ to $C_8$ oxyalkylene group, p is 0 or 1, n is an average number of total AO units added and ranges from 6 to 300, and the proportion of an oxyethylene group in $(AO)_n$ is 80 mol % or more, in the formula (II), $R^3$ is a hydrogen atom or a methyl group, X is an oxygen atom or an NH group, and $R^4$ is a $C_4$ to $C_{30}$ alkyl group or a $C_6$ to $C_{30}$ aryl group, in the formula (III), $R^5$ is a hydrogen atom or a methyl group, $R^6$ is a hydrogen atom or a $C_1$ to $C_3$ alkyl group, AO is a $C_2$ to $C_4$ oxyalkylene group, m is an average number of total AO units added and ranges from 3 to 150, and the proportion of an oxypropylene group and an oxybutylene group in $(AO)_m$ is 80 mol % or more, and in the formula (IV), $R^7$ is a hydrogen atom or a methyl group and $R^8$ is a hydrogen atom or a $C_1$ to $C_{30}$ alkyl group).

DETAILED DESCRIPTION OF THE INVENTION

Polishing Composition of the Present Invention

Figure 1:
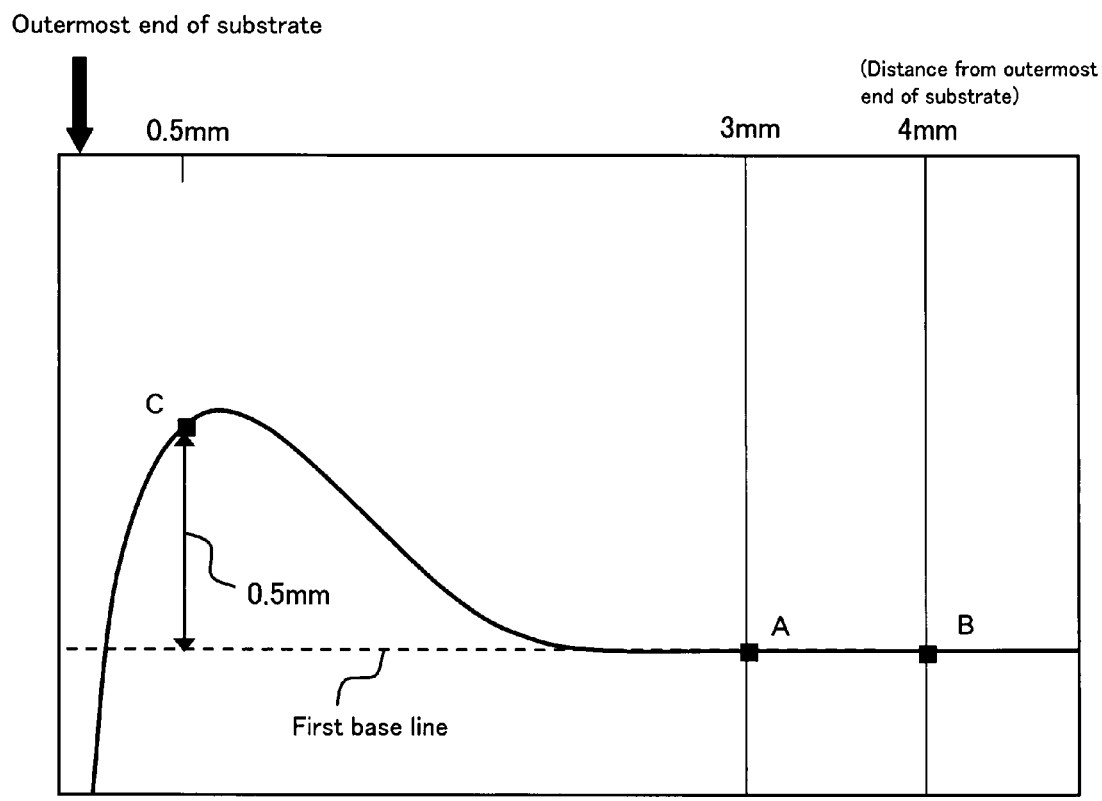
FIG. 1 is a cross-sectional view of a substrate showing the points at which 0.5 mm roll-off was measured in Examples of the present invention.

The present inventors found out that roll-off is caused by the deformation of a polishing pad during polishing of a substrate. Specifically, first, a polishing pressure is imposed while a substrate is polished, thus deforming a polishing pad. Then, high pressure is applied locally to the edge of the substrate due to the deformation of the polishing pad. Therefore, the edge of the substrate is overpolished. It is assumed that roll-off occurs as a result of overpolishing. The present inventors conducted many studies of reducing the pressure applied locally to the edge of the substrate and came to the conclusion that such pressure can be reduced by reducing a friction force between the polishing pad and the abrasive. In other words, a polishing composition of the present invention makes it possible to reduce the friction force between the polishing pad and the abrasive, compared to a conventional polishing composition. Accordingly, the amount of the abrasive held in the deformed portion becomes smaller than in the other portions of the polishing pad. Thus, it is assumed that the edge of the substrate is not overpolished and roll-off is suppressed. However, the present invention is not limited by these assumptions. The present invention can provide a polishing composition that is capable of suppressing roll-off in the polishing process of a substrate and a method for manufacturing a substrate using the polishing composition.

Copolymer

A polishing composition of the present invention includes as a roll-off suppressing agent a copolymer that has a constitutional unit expressed as the following formula (I) and at least one of constitutional units expressed as the following formulas (II) to (IV). In the copolymer, the constitutional unit of the formula (I) serves as a hydrophilic group, and the constitutional units of the formulas (II) to (IV) serve as a hydrophobic group. Moreover, the addition of the constitutional unit of the formula (I) and at least one of the constitutional units of the formulas (II) to (IV) may be in any of random, block and graft forms, or in combinations thereof.

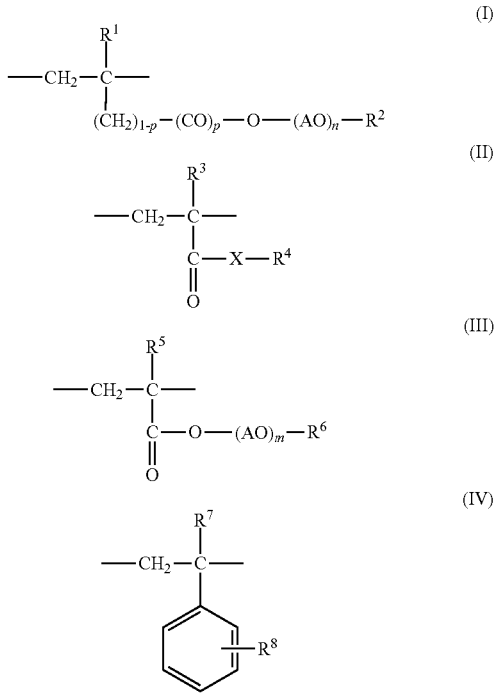

In the formula (I), $R^1$ is a hydrogen atom or a methyl group. In particular, the methyl group is preferred because the stability of the constitutional unit and the copolymer can be improved further. $R^2$ is an alkyl group having a carbon number of 1 to 4, preferably 1 to 3, and more preferably is a methyl group.

In the formula (I), AO is an oxyalkylene group including an oxyethylene group and having a carbon number of 1 to 8, and preferably 2 to 3. The proportion of the oxyethylene group in $(AO)_n$ is 80 mol % or more, preferably 90 mol % or more, and more preferably 100 mol %. In the formula (I), to suppress roll-off and foaming of the polishing composition and to improve the dispersibility of the copolymer, n is the average number of total AO units added and ranges from 6 to 300. The lower limit of n is preferably 9 or more, more preferably 23 or more, even more preferably 60 or more, and particularly preferably 90 or more, since this can further suppress roll-off and foaming of the polishing composition. The upper limit of n is preferably 250 or less, more preferably 200 or less, even more preferably 170 or less, and particularly preferably 150 or less, since this can further improve the dispersibility of the copolymer in the polishing composition. Therefore, n is a number preferably in the range of 9 to 250, more preferably in the range of 23 to 200, even more preferably in the range of 60 to 170, and particularly preferably in the range of 90 to 150. In the formula (I), p is 0 or 1. To suppress roll-off and foaming of the polishing composition and to improve the dispersibility of the copolymer, p is preferably 1.

As monomers for forming the constitutional unit of the formula (I), e.g., methoxypolyethylene glycol methacrylate (PEGMA), methoxypolyethylene glycol acrylate, etc. can be used in the case of p=1, and polyethylene glycol allyl ether can be used in the case of p=0.

In the formula (II), $R^3$ is a hydrogen atom or a methyl group. In particular, the methyl group is preferred because the stability of the constitutional unit and the copolymer can be improved further. X is an oxygen atom or an NH group. In particular, the oxygen atom is preferred because roll-off can be suppressed further. To suppress roll-off, $R^4$ is an alkyl group having a carbon number of 4 to 30, and preferably 4 to 22 or an aryl group having a carbon number of 6 to 30, and preferably 6 to 22. Since not only roll-off but also foaming of the polishing composition can be suppressed further, $R^4$ is preferably an alkyl group having a carbon number of 4 to 22, more preferably 8 to 18, and even more preferably 12 to 18. Moreover, $R^4$ may be any type of straight-chain, branched-chain and cyclic, may be either saturated or unsaturated, or may include an element other than a carbon atom and a hydrogen atom. The element may be, e.g., a nitrogen atom, an oxygen atom, or a sulfur atom.

Examples of monomers for forming the constitutional unit of the formula (II) include butyl methacrylate, hexyl methacrylate, octyl methacrylate, ethylhexyl methacrylate, decyl methacrylate, lauryl methacrylate (LMA), palmityl methacrylate, cetyl methacrylate, stearyl methacrylate (SMA), isostearyl methacrylate (ISMA), behenyl methacrylate (BMA), phenyl methacrylate, benzyl methacrylate (BzMA), cyclohexyl methacrylate, butyl acrylate, hexyl acrylate, octyl acrylate, ethylhexyl acrylate, decyl acrylate, lauryl acrylate, palmityl acrylate, cetyl acrylate, stearyl acrylate, isostearyl acrylate, behenyl acrylate, phenyl acrylate, benzyl acrylate, cyclohexyl acrylate, and t-butylacrylamide (TBAA).

In the formula (III), $R^5$ is a hydrogen atom or a methyl group, and $R^6$ is a hydrogen atom or an alkyl group having a carbon number of 1 to 3. It is preferable that both $R^5$ and $R^6$ are the methyl groups because the stability of the constitutional unit and the copolymer can be improved further. AO is an oxyalkylene group having a carbon number of 2 to 4, preferably 3 to 4, and more preferably is an oxypropylene group. The proportion of the oxypropylene group and the oxybutylene group in $(AO)_m$ is 80 mol % or more, preferably 90 mol % or more, and more preferably 100 mol %. In the formula (III), to suppress roll-off and to improve the dispersibility of the copolymer, m is the average number of total AO units added and ranges from 3 to 150. The lower limit of m is preferably 4 or more, more preferably 6 or more, even more preferably 9 or more, and particularly preferably 13 or more, since this can further suppress roll-off. The upper limit of m is preferably 100 or less, more preferably 75 or less, even more preferably 50 or less, and particularly preferably 20 or less, since this can further improve the dispersibility of the copolymer in the polishing composition. Therefore, m is a number preferably in the range of 4 to 100, more preferably in the range of 6 to 75, even more preferably in the range of 9 to 50, and particularly preferably in the range of 13 to 20.

As monomers for forming the constitutional unit of the formula (III), e.g., polypropylene glycol methacrylate (PPGMA), methoxypolypropylene glycol methacrylate, polypropylene glycol acrylate, methoxypolypropylene glycol acrylate, etc. can be used.

In the formula (IV), $R^7$ is a hydrogen atom or a methyl group, and preferably is a hydrogen atom. $R^8$ is a hydrogen atom or an alkyl group having a carbon number of 1 to 30, and preferably is a hydrogen atom to suppress roll-off and to improve the dispersibility of the copolymer. As monomers for forming the constitutional unit of the formula (IV), e.g., styrenes such as styrene (St), α-methyl styrene and vinyltoluene can be used, and styrene is preferred.

Examples of the copolymer include a methoxypolyethylene glycol methacrylate-lauryl methacrylate copolymer, a methoxypolyethylene glycol methacrylate-stearyl methacrylate copolymer, a methoxypolyethylene glycol methacrylate-isostearyl methacrylate copolymer, a methoxypolyethylene glycol methacrylate-behenyl methacrylate copolymer, a methoxypolyethylene glycol methacrylate-benzyl methacrylate copolymer, a methoxypolyethylene glycol methacrylate-polypropylene glycol methacrylate copolymer, and a methoxypolyethylene glycol methacrylate-styrene copolymer. These copolymers may be used individually or in combinations of two or more.

To suppress roll-off, the proportion of the sum of the constitutional units of the formulas (I) to (IV) to all the constitutional units of the copolymer is preferably 60 wt % or more, more preferably 70 wt % or more, and even more preferably 80 wt % or more.

In the copolymer, the weight ratio of the constitutional unit (hydrophilic group) of the formula (I) to the total of the constitutional units (hydrophobic group) of the formulas (II) to (IV) (the weight of a hydrophilic group/the weight of a hydrophobic group) is preferably 97.5/2.5 or less, more preferably 92.5/7.5 or less, and even more preferably 85/15 or less, since the friction force between the polishing pad and the abrasive can be reduced further by increasing the proportion of the hydrophobic group to some extent, and thus roll-off can be suppressed further. Moreover, the weight ratio is preferably 25/75 or more, more preferably 40/60 or more, and even more preferably 65/35 or more, since this can further improve the dispersibility of the copolymer in the polishing composition. Therefore, the weight ratio of the hydrophilic group to the hydrophobic group in the copolymer is preferably 25/75 to 97.5/2.5, more preferably 40/60 to 92.5/7.5, and even more preferably 65/35 to 85/15. The weight ratio of each of the constitutional units in the copolymer can be calculated by measuring a deuterated dimethyl sulfoxide solution containing 1 wt % of the copolymer with a proton nuclear magnetic resonance spectrum.

The weight-average molecular weight of the copolymer is preferably 5000 or more, more preferably 20000 or more, even more preferably 60000 or more, and even more preferably 90000 or more, since this can further suppress roll-off. Moreover, the weight-average molecular weight of the copolymer is preferably 500000 or less, more preferably 450000 or less, and even more preferably 400000 or less, since this can further improve the dispersibility of the copolymer in the polishing composition. Therefore, the weight-average molecular weight of the copolymer is preferably 5000 to 500000, more preferably 20000 to 500000, even more preferably 20000 to 450000, even more preferably 60000 to 450000, even more preferably 60000 to 400000, and even more preferably 90000 to 400000. The weight-average molecular weight can be measured by a gel permeation chromatography (GPC) method under the following conditions.

<GPC Conditions>
Column: α-M-α-M
Eluant: 60 mmol/L $H_3PO_4$, 50 mmol/L LiBr/DMF
Flow rate: 1.0 mL/min
Column temperature: 40° C.
Detector: RI
Reference material: polystyrene The copolymer may include other monomers in addition to the monomers for forming the constitutional units of the formulas (I) to (IV). By including the other monomers, the dispersibility of the copolymer in the polishing composition also can be improved further. Examples of the other monomers include an acrylic acid, methyl acrylate, ethyl acrylate, methacrylic acid (MAA), methyl methacrylate, ethyl methacrylate, acrylamide, dimethylacrylamide (DMAA), dimethylaminopropylacrylamide (DMAPAA), dimethylaminoethyl methacrylate (DMAEMA), hydroxyethyl methacrylate (HEMA), trimethylammonioethyl methacrylate chloride (QDM), methacryloyloxyethyl dimethylammonium ethyl sulfate (MOEDES), N,N-dimethylaminopropyl methacrylamide (DMAPMAAm), acrylamidemethylpropanesulfonic acid (AMPS), sodium styrenesulfonate (NaSS), and vinyl acetate. In view of the roll-off property, the proportion of the other monomers in the copolymer is preferably 40 wt % or less, more preferably 30 wt % or less, and even more preferably 20 wt % or less.

Examples of the copolymer including any of the other monomers include a methoxypolyethylene glycol methacrylate-t-butylacrylamide-dimethylacrylamide-dimethylaminopropylacrylamide copolymer and a methoxypolyethylene glycol methacrylate-stearyl methacrylate-methacrylic acid copolymer. These copolymers may be used individually or in combinations of two or more.

The content of the copolymer in the polishing composition of the present invention is preferably 3 wt % or less, more preferably 2 wt % or less, and even more preferably 1 wt % or less, since this can further suppress foaming of the polishing composition. Moreover, the content of the copolymer is preferably 0.001 wt % or more, more preferably 0.003 wt % or more, and even more preferably 0.005 wt % or more, since this can further suppress roll-off. Therefore, the content of the copolymer is preferably 0.001 to 3 wt %, more preferably 0.003 to 2 wt %, and even more preferably 0.005 to 1 wt %.

Abrasive

An abrasive used in the polishing composition of the present invention can be a general abrasive for polishing. Examples of the abrasive include a carbide, nitride, oxide, and boride of metals or semimetals, and diamond. The metal or semimetal elements belong to Group 2A, 2B, 3A, 3B, 4A, 4B, 5A, 6A, 7A or 8A of the periodic table (long-period form). Specific examples of the abrasive include α-alumina, intermediate alumina, aluminasol, silicon carbide, magnesium oxide, zinc oxide, cerium oxide, zirconium oxide, colloidal silica, and fumed silica. These materials can be used individually or in combinations of two or more. When a Ni—P plated aluminum alloy substrate is polished roughly, a combination of α-alumina and intermediate alumina (particularly θ alumina) can further improve the polishing rate and reduce the surface roughness, and thus can prevent surface defects. When a glass substrate is polished, a cerium oxide, alumina, and silica are preferred.

The average primary particle size of the abrasive is preferably 0.01 to 3 μm, more preferably 0.02 to 3 μm, and even more preferably 0.03 to 3 μm, since this can further suppress roll-off. When the primary particles are aggregated to form secondary particles, the average secondary particles size is preferably 0.02 to 3 μm, more preferably 0.05 to 3 μm, and even more preferably 0.1 to 3 μm, since this can further improve the polishing rate and suppress roll-off. The average primary particle size can be determined by image analysis of an enlarged photograph (preferably at a magnification of 3000 to 30000×) of the abrasive taken with a scanning electron microscope or an enlarged photograph (preferably at a magnification of 10000 to 30000×) of the abrasive taken with a transmission electron microscope. The average secondary particle size can be determined as a volume average particle size by using a laser diffraction method.

The specific gravity of the abrasive is preferably 2 to 6, more preferably 2 to 5, and even more preferably 2 to 4, since this can further improve the dispersibility of the abrasive in the polishing composition, and also can make it easier to supply the polishing composition to a polishing machine and to recover the polishing composition.

The content of the abrasive in the polishing composition of the present invention is preferably 0.05 wt % or more, more preferably 0.1 wt % or more, even more preferably 0.5 wt % or more, and particularly preferably 1 wt % or more, since this can further improve the polishing rate and reduce waviness of the substrate surface. Moreover, the content of the abrasive is preferably 40 wt % or less, more preferably 35 wt % or less, even more preferably 30 wt % or less, and particularly preferably 25 wt % or less, since this can further suppress roll-off and improve the quality of the substrate surface to be obtained. Therefore, the content of the abrasive is preferably 0.05 to 40 wt %, more preferably 0.1 to 35 wt %, even more preferably 0.5 to 30 wt %, and particularly preferably 1 to 25 wt %.

Acid

The polishing composition of the present invention may further include an acid, and both inorganic and organic acids can be used. Examples of the inorganic acid include a nitric acid, nitrous acid, sulfuric acid, sulfurous acid, amidosulfonic acid, phosphoric acid, polyphosphoric acid, and phosphonic acid. Examples of the organic acid include a glycolic acid, oxalic acid, succinic acid, maleic acid, fumaric acid, itaconic acid, malic acid, tartaric acid, citric acid, phosphonohydroxyacetic acid, hydroxyethylidene-1,1-diphosphonic acid, phosphonobutanetricarboxylic acid, and ethylenediaminetetramethylenephosphonic acid. Among these acids, to improve the polishing rate further and to reduce waviness further, it is preferable to use, e.g., a sulfuric acid, sulfurous acid, amidosulfonic acid, phosphoric acid, polyphosphoric acid, phosphonic acid, oxalic acid, succinic acid, itaconic acid, malic acid, citric acid, hydroxyethylidene-1,1-diphosphonic acid, and ethylenediaminetetramethylenephosphonic acid, and more preferably to use a sulfuric acid, phosphoric acid, polyphosphoric acid, itaconic acid, and citric acid. These acids can be used individually or in combinations of two or more. Moreover, part or the whole of the acids may be neutralized and present in the form of salts in the polishing composition.

The content of the acid in the polishing composition of the present invention is preferably 0.05 wt % or more, more preferably 0.075 wt % or more, and even more preferably 0.1 wt % or more, since this can further improve the polishing rate. Moreover, the content of the acid is preferably 10 wt % or less, more preferably 7.5 wt % or less, and even more preferably 5 wt % or less, since this can further suppress corrosion of the polishing machine. Therefore, the content of the acid is preferably 0.05 to 10 wt %, more preferably 0.075 to 7.5 wt %, and even more preferably 0.1 to 5 wt %.

Oxidizing Agent

The polishing composition of the present invention may further include an oxidizing agent. Examples of the oxidizing agent include a peroxide, peroxoacid of a metal or its salt, and oxyacid or its salt. The oxidizing agent is classified broadly into an inorganic oxidizing agent and an organic oxidizing agent by the structure. The inorganic oxidizing agent is preferred because it can further improve the polishing rate, and also can increase the availability and the ease of handling such as solubility in water. Examples of the inorganic oxidizing agent include a hydrogen peroxide, peroxide of an alkali metal or alkaline-earth metal, peroxocarbonate, peroxosulfuric acid or its salt, peroxophosphoric acid or its salt, peroxoborate, peroxochromate, permanganate, halogen-containing oxyacid salt, and inorganic acid metal salt. The peroxide of an alkali metal or alkaline-earth metal may be, e.g., sodium peroxide, potassium peroxide, calcium peroxide, barium peroxide, magnesium peroxide, etc. The peroxocarbonate may be, e.g., sodium peroxocarbonate, potassium peroxocarbonate, etc. The peroxosulfuric acid or its salt may be, e.g., ammonium peroxodisulfate, sodium peroxodisulfate, potassium peroxodisulfate, peroxomonosulfuric acid, etc. The peroxophosphoric acid or its salt may be, e.g., sodium peroxophosphate, potassium peroxophosphate, ammonium peroxophosphate, etc. The peroxoborate may be, e.g., sodium peroxoborate, potassium peroxoborate, etc. The peroxochromate may be, e.g., sodium peroxochromate, potassium peroxochromate, etc. The permanganate may be, e.g., sodium permanganate, potassium permanganate, etc. The halogen-containing oxyacid salt may be, e.g., sodium perchlorate, potassium perchlorate, sodium hypochlorite, sodium periodate, potassium periodate, sodium iodate, potassium iodate, etc. The inorganic acid metal salt may be, e.g., iron (III) chloride, iron (III) sulfate, etc. On the other hand, examples of the organic oxidizing agent include percarboxylic acids, peroxide, and organic acid iron (III). The percarboxylic acids may be, e.g., peracetic acid, performic acid, perbenzoic acid, etc. The peroxide may be, e.g., t-butylperoxide, cumene peroxide, etc. The organic acid iron (III) may be, e.g., iron (III) citrate etc. In particular, it is preferable to use a hydrogen peroxide, sodium peroxoborate, sodium iodate, and potassium iodate. These oxidizing agents may be used individually or in combinations of two or more.

The content of the oxidizing agent in the polishing composition of the present invention is preferably 0.002 wt % or more, more preferably 0.005 wt % or more, even more preferably 0.007 wt % or more, and particularly preferably 0.01 wt % or more, since this can further improve the polishing rate and, also can reduce both waviness and contamination of the substrate surface. The content of the oxidizing agent is preferably 20 wt % or less, more preferably 15 wt % or less, even more preferably 10 wt % or less, and particularly preferably 5 wt % or less, since this can further suppress roll-off and improve the quality of the substrate surface to be obtained. Therefore, the content of the oxidizing agent is preferably 0.002 to 20 wt %, more preferably 0.005 to 15 wt %, even more preferably 0.007 to 10 wt %, and particularly preferably 0.01 to 5 wt %.

Medium

A medium used in the polishing composition of the present invention can be water. Examples of the water include distilled water, ion-exchanged water, pure water, and ultrapure water. The content of the medium in the polishing composition is preferably 55 wt % or more, more preferably 75 wt % or more, even more preferably 85 wt % or more, and particularly preferably 90 wt % or more, since this can further facilitate handling of the polishing composition. Moreover, the content of the medium is preferably 99.8 wt % or less, more preferably 99.3 wt % or less, and even more preferably 98.8 wt % or less, since this can further improve the polishing rate and suppress roll-off. Therefore, the content of the medium is preferably 55 to 99.8 wt %, more preferably 75 to 99.3 wt %, even more preferably 85 to 98.8 wt %, and particularly preferably 90 to 98.8 wt %.

The pH of the polishing composition of the present invention can be determined appropriately in accordance with the material or the like of a substrate to be polished. The pH is preferably 1 or more, more preferably 1.2 or more, and even more preferably 1.4 or more, so that the substrate to be polished can be cleaned more easily, the corrosion of a processing machine can be suppressed further, and the workers can conduct operations more safely. In general, since the oxidizing agent is likely to be more stable under acidic conditions, the pH is preferably 12 or less, more preferably 11 or less, and even more preferably 10 or less. Therefore, the pH of the polishing composition is preferably 1 to 12, more preferably 1.2 to 11, and even more preferably 1.4 to 10. When the substrate to be polished is a metal material, the pH is preferably less than 7, more preferably 6 or less, even more preferably 5 or less, and particularly preferably 4 or less to improve the polishing rate.

The polishing composition of the present invention may further include a bactericidal agent, an antimicrobial agent, a thickening agent, a dispersing agent, a rust-preventive agent, a basic substance, a pH adjuster, etc. In view of the polishing characteristics, the content of these components in the polishing composition is preferably 10 wt % or less, more preferably 8 wt % or less, and even more preferably 6 wt % or less.

Although the polishing composition of the present invention can be used for all polishing processes in the manufacturing method of a substrate, it is particularly suitable for a rough polishing process in the manufacturing method of a substrate.

Method for Preparing the Polishing Composition

There is no particular limitation to a method for preparing the polishing composition of the present invention. For example, the polishing composition can be prepared by mixing the copolymer and the abrasive in an appropriate aqueous medium. The abrasive can be dispersed using any stirring device such as a homomixer, homogenizer, ultrasonic disperser, or wet ball mill.

The pH of the polishing composition may be adjusted to a predetermined value either before or after mixing the above components. The pH adjustment can be performed with a pH adjuster.

Method for Manufacturing a Substrate of the Present Invention

A method for manufacturing a substrate of the present invention includes a step of polishing a substrate to be polished with the polishing composition of the present invention. Because of the polishing process that uses the polishing composition of the present invention, the manufacturing method can produce a substrate in which roll-off is suppressed. The manufacturing method is characterized only by the process of polishing a substrate to be polished with the polishing composition of the present invention, and the other conditions and processes are not limited at all. An embodiment of the manufacturing method of the present invention can be a method for manufacturing a hard disk substrate.

In the polishing process, the polishing composition of the present invention is supplied to a polishing surface of a substrate to be polished, and a polishing pad is brought into contact with the polishing surface. Then, polishing is performed, e.g., by moving the polishing pad or the substrate to be polished while applying a predetermined pressure (load). In this case, the substrate can be polished with a conventionally known polishing machine.

The polishing composition may be used as it is. If the polishing composition is in the form of a concentrated solution, it may be diluted. In such a case, the dilution rate is not particularly limited, and can be determined appropriately in accordance with the concentration of each component (e.g., the content of the abrasive) in the concentrated solution, the polishing conditions, or the like.

The polishing pad is not particularly limited, and a conventionally known polishing pad can be used. The material of the polishing pad may be, e.g., an organic polymer such as polyurethane. The shape of the polishing pad is preferably a nonwoven fabric.

The polishing pressure means the pressure of a surface plate applied to the polishing surface of the substrate to be polished during polishing. The polishing pressure of the present invention is preferably 50 kPa or less, more preferably 40 kPa or less, and even more preferably 30 kPa or less, since this can further suppress roll-off. Moreover, the polishing pressure is preferably 3 kPa or more, more preferably 5 kPa or more, and even more preferably 7 kPa or more, since this can further improve the productivity. Therefore, the polishing pressure is preferably 3 to 50 kPa, more preferably 5 to 40 kPa, and even more preferably 7 to 30 kPa. The polishing pressure can be adjusted by controlling air pressure or a weight imposed on the surface plate or the substrate.

In view of cost, the supply rate of the polishing composition is preferably 0.25 mL/min or less, and more preferably 0.2 mL/min or less per 1 $cm^2$ of the substrate to be polished. Moreover, the supply rate is preferably 0.01 mL/min or more, more preferably 0.025 mL/min or more, and even more preferably 0.05 mL/min or more per 1 $cm^2$ of the substrate to be polished, since this can further improve the polishing rate. Therefore, the supply rate is preferably 0.01 to 0.25 mL/min, more preferably 0.025 to 0.2 mL/min, and even more preferably 0.05 to 0.15 mL/min.

The substrate to be polished is not particularly limited, but preferably is a substrate for a recording disk that is used as a recording medium, e.g., a substrate to be polished for manufacturing a hard disk substrate. Examples of the substrate to be polished as a hard disk substrate include a substrate obtained by plating an aluminum alloy, glass, or glassy carbon with Ni—P. Moreover, instead of the Ni—P plating, a substrate may be coated with various types of metal compounds by plating or vapor deposition.

Method for Polishing a Semiconductor Substrate and Method for Manufacturing a Semiconductor Device The polishing composition of the present invention can reduce roll-off, even if it is used to polish a semiconductor substrate. Therefore, the present invention relates to a method for polishing a semiconductor substrate as an embodiment. The semiconductor substrate may be, e.g., a silicon wafer or any of substrates made of an elementary semiconductor such as Si or Ge, a compound semiconductor such as GaAs, InP or CdS, and a mixed crystal such as InGaAs or HgCdTe.

The polishing composition of the present invention also can be applied to a polishing process during the manufacture of a semiconductor device. The polishing process includes chemical-mechanical polishing (CMP). Therefore, the present invention relates to a method for manufacturing a semiconductor device as another embodiment. The manufacturing method of a semiconductor device may include the following: a thin film formation process of forming a thin film on one principal surface of a semiconductor substrate; an embossed surface formation process of forming a convexoconcave pattern on the other surface of the semiconductor substrate that faces away from the thin film; and a polishing process of polishing the embossed surface with the polishing composition of this embodiment. The thin film formation process may be performed two or more times as needed.

The thin film formed in the thin film formation process may be, e.g., an insulating layer, a conductor layer such as a metal layer or semiconductor layer, etc. The material contained in the insulating layer may be, e.g., a silicon oxide, silicon nitride, or polysilicon. The embossed surface may be formed, e.g., by a conventionally known lithography technique. In the lithography technique, e.g., photoresist application, exposure, development, etching, and photoresist removal may be performed in this order.

EXAMPLES

The following examples further describe and demonstrate embodiments of the present invention. The examples are given solely for the purpose of illustration and are not to be construed as limitations of the present invention.

Examples 1 to 18

In Examples 1 to 18, polishing compositions were prepared by using copolymers that were synthesized from the monomers (materials) shown in Table 1. Then, substrates to be polished were polished with each of the polishing compositions prepared, and roll-off of the polished substrates was evaluated.

1. Synthesis of Copolymer

Hereinafter, the synthesis of a copolymer will be described by referring to Example 5. In Examples 1 to 4 and 6 to 18, copolymers were prepared in the same manner as Example 5 except that the monomers in Table 1 were used as materials.

A copolymer was synthesized by using methoxypolyethylene glycol (23 mol) methacrylate (PEGMA (EO23)) as a monomer for forming the constitutional unit of the formula (I), and stearyl methacrylate (SMA) as a monomer for forming the constitutional unit of the formula (II). Specifically, 90 g of (PEGMA (EO23)), 10 g of SMA, 100 g of methyl ethyl ketone that served as a polymerization solvent, and 1.0 g of a polymerization initiator ("V-65" manufactured by Wako Pure Chemical Industries, Ltd.) were placed in a reactor provided with an agitator, a reflux condenser, a thermometer, and a nitrogen inlet tube. After a polymerization reaction was performed at 650 for 6 hours, the product was dried, resulting in a copolymer. The weight-average molecular weight of the copolymer thus obtained was 125000. The proportion of (PEGMA (EO23)) in the copolymer was 90 wt %, and the proportion of SMA in the copolymer was 10 wt %.

2. Preparation of Polishing Composition

The polishing compositions in Examples 1 to 18 were prepared by mixing each of the copolymers prepared, α-alumina particles (average secondary particle size: 0.45 μm), θ alumina particles (average secondary particle size: 0.22 μm), a sulfuric acid (98% product), a citric acid, ammonium sulfate, and hydrogen peroxide (30 wt % product, manufactured by Adeka Corporation) with water. The content of the copolymer in the polishing composition was 0.02 wt %. The content of the alumina particles (i.e., the total amount of the α-alumina particles and the 0 alumina particles) in the polishing composition was 3.84 wt %. The pH of the polishing composition was 1.6. The contents of the other components were as follows: 0.32 wt % for the sulfuric acid; 0.97 wt % for the citric acid; 0.52 wt % for the ammonium sulfate; and 0.58 wt % for the hydrogen peroxide. In Examples 6-1 and 6-2, the polishing compositions were prepared in the same manner as Example 6 except that the content of the copolymer was 0.003 wt % and 0.005 wt %, respectively.

3. Measuring Method (Measuring Method of a Weight-Average Molecular Weight)

The copolymer was dissolved in chloroform, and a weight-average molecular weight was measured by GPC (gel permeation chromatography, eluent: 60 mmol/L $H_3PO_4$, 50 mmol/L LiBr/DMF, Reference material: polystyrene).

(Measuring Method of a Proportion of Each Constitutional Unit in the Copolymer)

The copolymer was dissolved in a deuterated dimethyl sulfoxide solution (copolymer concentration: 1 wt %) and measured with a proton nuclear magnetic resonance spectrum.

(Measuring Method of an Average Secondary Particle Size of the Alumina Particles)

An average secondary particle size of each of the α-alumina particles and the θ alumina particles was calculated as a volume average particle size by using a laser diffraction method.

4. Polishing method

The substrates were polished with each of the polishing compositions prepared for 4 minutes under the following polishing conditions (the amount of one-side polishing was 2.2 μm).

(Substrate to be Polished)

A Ni—P plated aluminum alloy substrate was used as the substrate to be polished. This substrate had a thickness of 1.27 mm and a diameter of 95 mm.

(Polishing Conditions)

Polishing test machine: a double-sided polishing machine ("9B Double Side Polisher" manufactured by Speedfam Co., Ltd.)

Polishing pad: a product with a thickness of 1.04 mm and an average pore diameter of 43 μm (manufactured by FILWEL CO., LTD.)

Number of revolutions of the surface plate: 45 rpm

Polishing pressure: 7.7 kPa (set value)

Supply of polishing slurry: 100 mL/min (0.076 mL)/($cm^2 \cdot min$)

Polishing time: 4 minutes

Number of substrates inserted into the polishing machine: 10

5. Roll-Off Evaluation

After polishing, 0.5 mm roll-off and 1.0-3.0 Valley roll-off of each of the substrates were measured under the following conditions. Tables 1 and 2 show the results along with the compositions of the copolymers. The roll-off measurement was performed in such a manner that one of the 10 substrates was selected, then roll-off was measured at any three points of this substrate, and a mean value of the three points was determined as a result of the measurement. The 0.5 mm roll-off value indicates that the edge of the substrate rises as the value increases, and thus roll-off is suppressed. The 1.0-3.0 Valley roll-off value indicates that the edge of the substrate rises as the value decreases (i.e., the absolute value increases), and thus roll-off is suppressed.

(Roll-Off Measurement)

For roll-off measurement, 0.5 mm roll-off and 1.0-3.0 Valley roll-off were measured under the following conditions.

0.5 mm Roll-Off

As shown in FIG. 1, two points on the surface of the substrate that are 3.0 mm and 4.0 mm away from the outermost edge of the substrate are identified as A and B, respectively. Then, an extension line containing the two points A and B is identified as a first base line. A distance between the first base line and a point C on the surface of the substrate that is 0.5 mm away from the outermost edge of the substrate is measured, and the shortest distance is determined as 0.5 mm roll-off (nm) (also referred to as "0.5 mm" in the following).

1.0-3.0 Valley Roll-Off

Figure 2:
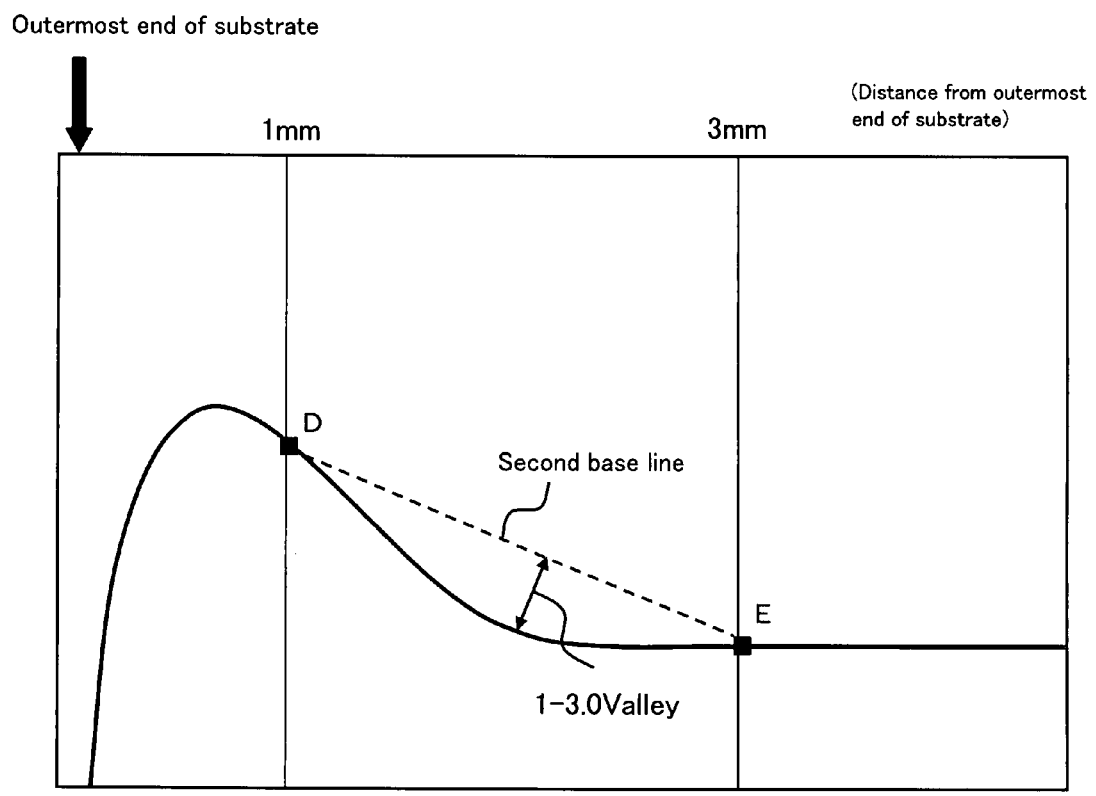
FIG. 2 is a cross sectional view of a substrate showing the points at which 1.0-3.0 Valley roll-off was measured in Examples of the present invention.

As shown in FIG. 2, two points on the surface of the substrate that are 1.0 mm and 3.0 mm away from the outermost edge of the substrate are identified as D and E, respectively. Then, a line joining the two points D and E is identified as a second base line. When a line at right angles to the second base line is drawn from the second base line to the surface of the substrate, the length of this line is measured as a distance between the second base line and the substrate surface, and the longest distance is determined as 1.0-3.0 Valley roll-off (nm) (also referred to as "1.0-3.0 Valley" in the following).

(Measurement Conditions)
Measuring device: "New View 5032" manufactured by Zygo Corporation
Lens: 2.5×
Zoom: 0.5×
Analysis software: "Zygo Metro Pro" (manufactured by Zygo Corporation)

Comparative Examples 1 to 12

In Comparative Examples 1 to 7, polishing compositions were prepared in the same manner as Example 5 except that the monomers in Table 1 were used as materials. Comparative Example 1 did not use a copolymer. In Comparative Examples 8 to 12, polishing compositions were prepared in the same manner as Example 5 except that the components shown in Table 2 were used instead of the copolymers. Then, substrates to be polished were polished with each of the polishing compositions of Comparative Examples 1 to 12 in the same manner as the above Examples, and roll-off of the polished substrates was evaluated. Tables 1 and 2 show the results along with the compositions of the copolymers.

TABLE 2

|  | Components | Molecular weight | Roll-off 0.5 mm | Roll-off 1.0-3.0 Valley |
|---|---|---|---|---|
| Comp. Ex. 8 | Polyoxyethylene stearyl ether (EO(50 mol)) | — | 17 | −3.22 |
| Comp. Ex. 9 | Polyoxyethylene stearyl ether (EO(140 mol)) | — | 23 | −3.39 |
| Comp. Ex. 10 | Pluronic surfactant: F108 (manufactured by Adeka Corporation) | 16250 | 31 | −3.02 |
| Comp. Ex. 11 | Polyoxyethylene sorbitan monostearate (EO(20 mol)) (manufactured by Kao Corporation) | — | 23 | −3.39 |
| Comp. Ex. 12 | Hydroxyethylcellulose (HEC) (manufactured by Wako Pure Chemical Industries, Ltd.) | 1000000 | 2 | −1.11 |

As shown in Tables 1 and 2, all the substrates polished with the polishing compositions of Examples 1 to 18 had a larger 0.5 mm roll-off value and a smaller 1.0-3.0 Valley roll-off value (i.e., a larger absolute value), compared to the substrates polished with the polishing compositions of Comparative Examples 1 to 12. This confirmed that roll-off was suppressed by using the polishing compositions of Examples 1 to 18.

TABLE 1

|  | Constitutional unit of (I) PEGMA (EO(mol)) | | Constitutional unit of (II) or (III) Material monomer | wt % | Other components Material monomer | wt % | Molecular weight | Roll-off 0.5 mm | Roll-off 1.0-3.0 Valley |
|---|---|---|---|---|---|---|---|---|---|
| Ex. 1 | 9 mol | 80 | LMA | 20 | — | — | 96000 | 39 | −5.77 |
| Ex. 2 | 120 mol | 95 | LMA | 5 | — | — | 367000 | 43 | −5.57 |
| Ex. 3 | 120 mol | 90 | LMA | 10 | — | — | 76000 | 55 | −6.08 |
| Ex. 4 | 9 mol | 90 | SMA | 10 | — | — | 101000 | 44 | −4.59 |
| EX. 5 | 23 mol | 90 | SMA | 10 | — | — | 125000 | 47 | −5.62 |
| Ex. 6 | 23 mol | 80 | SMA | 20 | — | — | 113000 | 54 | −7.12 |
| Ex. 6-1 | 23 mol | 80 | SMA | 20 | — | — | 113000 | 53 | −6.98 |
| Ex. 6-2 | 23 mol | 80 | SMA | 20 | — | — | 113000 | 50 | −7.00 |
| Ex. 7 | 90 mol | 90 | SMA | 10 | — | — | 63000 | 39 | −5.87 |
| Ex. 8 | 90 mol | 90 | SMA | 10 | — | — | 99000 | 42 | −5.99 |
| Ex. 9 | 90 mol | 90 | SMA | 10 | — | — | 235000 | 55 | −7.54 |
| Ex. 10 | 120 mol | 90 | SMA | 10 | — | — | 51000 | 41 | −5.34 |
| Ex. 11 | 9 mol | 60 | ISMA | 40 | — | — | 79000 | 50 | −6.55 |
| Ex. 12 | 23 mol | 70 | BMA | 30 | — | — | 72000 | 46 | −6.31 |
| Ex. 13 | 23 mol | 80 | BzMA | 20 | — | — | 94000 | 45 | −5.87 |
| Ex. 14 | 23 mol | 80 | PPGMA (PO(13 mol)) | 20 | — | — | 83000 | 40 | −5.19 |
| Ex. 15 | 9 mol | 21.6 | TBAA | 52.1 | DMAA DMAPAA | 24.6 1.7 | 100000 | 41 | −5.25 |
| Ex. 16 | 9 mol | 50 | SMA | 45 | MAA | 5 | 69000 | 48 | −6.89 |
| Ex. 17 | 9 mol | 78.5 | SMA | 20 | MAA HEMA DMAEMA | 0.5 0.5 0.5 | 206000 | 46 | −6.89 |
| Ex. 18 | 23 mol | 80 | St | 20 | — | — | 32000 | 44 | −5.2 |
| Comp. Ex. 1 | — | — | — | — | — | — | — | −10 | −0.80 |
| Comp. Ex. 2 | 90 mol | 90 | — | — | MAA | 10 | 187000 | 27 | −3.86 |
| Comp. Ex. 3 | 90 mol | 90 | — | — | MAA | 10 | 325000 | 24 | −3.71 |
| Comp. Ex. 4 | 90 mol | 100 | — | — | — | — | 61000 | 22 | −3.86 |
| Comp. Ex. 5 | 120 mol | 96.4 | — | — | MAA | 3.6 | 83000 | 17 | −3.44 |
| Comp. Ex. 6 | 120 mol | 92.6 | — | — | MAA | 7.4 | 52000 | 20 | −3.10 |
| Comp. Ex. 7 | 120 mol | 84.7 | — | — | MAA | 15.3 | 49000 | 25 | −3.42 |

Example 19

In Example 19, a polishing composition was prepared in the following manner by using the same copolymer as Example 6. Then, a substrate to be polished (silicon wafer) was polished with the polishing composition prepared, and roll-off of the polished substrate was evaluated.

1. Preparation of Polishing Composition

The polishing composition was prepared by mixing the copolymer, colloidal silica (average particle size: 30 nm), ammonia, hydroxyethylcellulose, and diethylene glycol with water. The content of each component was as follows: 0.002 wt % (20 ppm) for the copolymer (used in Example 6); 0.5 wt % (purity conversion of silica) for the colloidal silica; 0.02 wt % (200 ppm, purity conversion) for the ammonia; 0.0175 wt % (175 ppm, purity conversion) for the hydroxyethylcellulose; and 0.005 wt % (50 ppm, purity conversion) for the diethylene glycol.

2. Polishing Method

The substrate was polished with the polishing composition prepared for 20 minutes under the following polishing conditions (the amount of one-side polishing was 1.2 μm).

(Substrate to be Polished)

A silicon wafer was used as the substrate to be polished. This substrate had a thickness of 500 μm and a diameter of 50.5 mm.

(Polishing Conditions)

Polishing test machine: a single-sided polishing machine ("MA-300" with a platen diameter of 300 mm, manufactured by Musashino Electronic Co., Ltd.)

Polishing pad: #-27 (manufactured by Fujibo)

Number of revolutions of the surface plate: 90 rpm

Polishing pressure: 250 g/cm² (24.5 kPa)

Supply of polishing liquid: 7 mL/min

Polishing time: 20 minutes

Number of substrates inserted into the polishing machine: 1

3. Roll-Off Evaluation

After polishing, 0.5 mm roll-off and 1.0-3.0 Valley roll-off of the silicon wafer were measured under the same conditions as described above. Table 3 shows the results along with the composition of the copolymer.

Comparative Example 13

In Comparative Example 13, a polishing composition was prepared in the same manner as Example 19 except that no copolymer was used. Then, a substrate to be polished was polished with the polishing composition in the same manner as Example 19, and roll-off of the polished substrate was evaluated. Table 3 shows the results.

TABLE 3

| | Constitutional unit of (I) | | Constitutional unit of (II) or (III) | | Other components | | | Roll-off | |
|---|---|---|---|---|---|---|---|---|---|
| | PEGMA (EO(mol)) | wt % | Material monomer | wt % | Material monomer | wt % | Molecular weight | 0.5 mm | 1.0-3.0 Valley |
| Ex. 19 | 23 mol | 80 | SMA | 20 | — | — | 113000 | 13 | −2.54 |
| Comp. Ex. 13 | — | — | — | — | — | — | — | −40 | −0.12 |

As shown in Table 3, the silicon wafer polished with the polishing composition of Example 19 had a larger 0.5 mm roll-off value and a smaller 1.0-3.0 Valley roll-off value (i.e., a larger absolute value), compared to the substrate polished with the polishing composition of Comparative Example 13. This confirmed that roll-off was suppressed by using the polishing composition of Example 19.

The above results show that the polishing composition of the present invention that includes a copolymer having the constitutional unit of the formula (I) and at least one of the constitutional units of the formulas (II) to (IV) can suppress roll-off.

According to the polishing composition of the present invention, roll-off can be suppressed during the polishing process of a substrate. Therefore, the polishing composition of the present invention is useful for the manufacture of various substrates, and particularly for the manufacture of a hard disk substrate.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A polishing composition comprising a copolymer and an abrasive, wherein the copolymer has a constitutional unit expressed as the following formula (I) and a constitutional unit of formula (IV):

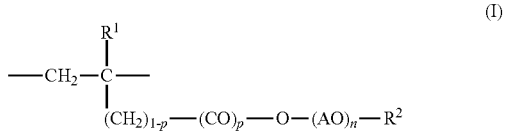

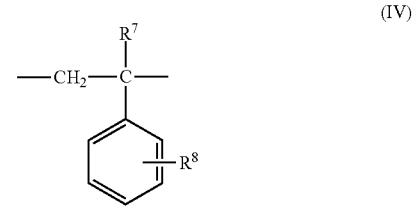

wherein in the formula (I), $R^1$ is a hydrogen atom or a methyl group, $R^2$ is a methyl group, AO is an oxyethylene group, p is 1, n is an average number of total AO units added and ranges from 9 to 300, and in the formula (IV), $R^7$ is a hydrogen atom and $R^8$ is a hydrogen atom, wherein a weight ratio of the constitutional unit of formula (I) to the constitutional unit of formula (IV) is 65/35 to 97.5/2.5.

2. The polishing composition according to claim 1, wherein a weight-average molecular weight of the copolymer is 5000 to 500000.

3. The polishing composition according to claim 1, wherein the abrasive is alumina.

4. A method for manufacturing a substrate comprising:
polishing a substrate to be polished with the polishing composition according to claim 1.

5. The method for manufacturing a substrate according to claim 4, wherein the substrate is a substrate used for a hard disk.

6. The polishing composition according to claim 1, wherein
$R^1$ in the formula (I) is methyl;
n in the formula (I) is a number from 9 to 150;
a weight-average molecular weight of the copolymer is 5000 to 500000; and
the abrasive is alumina.

* * * * *